United States Patent
Hirose

(10) Patent No.: US 9,597,827 B2
(45) Date of Patent: Mar. 21, 2017

(54) MOLD CLAMPING FORCE SETTING DEVICE AND MOLD CLAMPING FORCE SETTING METHOD OF INJECTION MOLDING MACHINE

(71) Applicant: FANUC Corporation, Yamanashi (JP)

(72) Inventor: Daisuke Hirose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 154 days.

(21) Appl. No.: 14/587,936

(22) Filed: Dec. 31, 2014

(65) Prior Publication Data

US 2015/0197052 A1 Jul. 16, 2015

(30) Foreign Application Priority Data

Jan. 15, 2014 (JP) .................................. 2014-005496

(51) Int. Cl.
   *B29C 45/76* (2006.01)

(52) U.S. Cl.
   CPC ... *B29C 45/7653* (2013.01); *B29C 2945/76103* (2013.01); *B29C 2945/76234* (2013.01); *B29C 2945/76391* (2013.01); *B29C 2945/76505* (2013.01); *B29C 2945/76869* (2013.01); *B29C 2945/76943* (2013.01); *B29C 2945/76973* (2013.01)

(58) Field of Classification Search
   CPC .................. B29C 2945/76234; B29C 45/7653
   See application file for complete search history.

(56) References Cited

U.S. PATENT DOCUMENTS

| 5,756,019 | A | | 5/1998 | Nakazawa et al. |
| 6,068,463 | A | * | 5/2000 | Urbanek ............. B29C 45/1761 100/231 |
| 7,458,796 | B2 | * | 12/2008 | Morii ..................... B29C 45/17 264/40.1 |
| 2008/0053188 | A1 | * | 3/2008 | Itoh ........................ B22D 17/26 73/1.15 |

FOREIGN PATENT DOCUMENTS

| DE | 102012018749 A1 | 4/2013 |
| JP | H08-252849 A | 10/1996 |
| JP | 2007-30496 A | 2/2007 |
| JP | 2008-006651 A | 1/2008 |
| JP | 2013-075382 A | 4/2013 |

OTHER PUBLICATIONS

Office Action mailed Mar. 3, 2015, corresponding to Japanese patent application No. 2014-005496.

* cited by examiner

*Primary Examiner* — Jill Heitbrink
(74) *Attorney, Agent, or Firm* — Hauptman Ham, LLP

(57) ABSTRACT

A distortion sensor is provided on each of a plurality of tie bars and the extension amount of each tie bar is detected by the distortion sensor thereof, whereby a mold clamping force actually applied to a mold is measured. This measurement specifies the part of the mold that first opens and obtains a minimum mold clamping force that does not open the mold in that part. The minimum mold clamping force thus obtained is the minimum mold clamping force that does not open the mold without being influenced by factors such as the shape and the arrangement of a cavity in the mold and the mold clamping force balance of a mold clamping part of an injection molding machine.

10 Claims, 8 Drawing Sheets

STATE 1

STATE 2

STATE 3

STATE 1

STATE 2

STATE 3

MOLD CLAMPING FORCE SETTING DEVICE AND MOLD CLAMPING FORCE SETTING METHOD OF INJECTION MOLDING MACHINE

RELATED APPLICATIONS

The present application claims priority to Japanese Application Number 2014-005496, filed Jan. 15, 2014, the disclosure of which is hereby incorporated by reference herein in its entirety.

BACKGROUND OF THE INVENTION

1. Field of the Invention

The present invention relates to a mold clamping force setting device and a mold clamping force setting method of an injection molding machine for obtaining appropriate mold clamping force that can prevent burr generation due to the resin pressure when resin is injected into a mold of the injection molding machine and at the same time prevent deformation of the mold.

2. Description of the Related Art

In an injection molding cycle, molten resin is injected into a mold after the mold is closed in a mold closing process and then a mold clamping force is generated in a mold clamping process. When the molten resin is injected into the mold, burr may be generated with the mold opening if the mold clamping force is not sufficient with respect to the pressure with which the molten resin is generated. By contrast, if the mold clamping force is excessive, although there is no risk of burr generation, problems may occur that the product quality is lowered due to poor outgassing and the mold life is shortened due to excess mold clamping force applied to the mold. For this reason, the mold clamping force is set to the minimum value that does not open the mold at the time of injection, whereby burr generation is prevented, good outgassing conditions are enabled, and excess burden on the mold can be prevented. It is thus desirable that the minimum mold clamping force that does not open the mold be obtained and set.

As a technique to obtain the minimum mold clamping force, Japanese Patent Application Laid-Open No. 2008-6651 discloses a mold clamping force setting method with which the mold clamping force is gradually changed and the minimum mold clamping force to be applied to the mold is obtained based on the detected change in the mold clamping force. Furthermore, Japanese Patent Application Laid-Open No. 8-252849 discloses a mold clamping force setting method with which the minimum mold clamping force is obtained in view of change in the approximate linear relation established between the set mold clamping force and the maximum mold clamping force increase amount which is the difference between the maximum mold clamping force value during injection and the set mold clamping force.

There are problems in terms of effectiveness and accuracy with the mold clamping force setting methods described above, with which the minimum mold clamping force is obtained. When these mold clamping force setting methods are used in practical cases, it is necessary to identify the part of the mold that first opens and detect the mold clamping force applied on the area surrounding the part as an index.

A technique that solves the problems described above is disclosed in Japanese Patent Application Laid-Open No. 2013-75382 (corresponding to DE 10 2012 018 749 A1). According to this technique, the difference between the mold clamping force generated when the mold is closed and the mold clamping force during injection is detected as the maximum mold clamping force increase amount. From the detected maximum mold clamping force increase amount, the minimum mold clamping force that does not open the mold is obtained. With this technique, burr generation due to the mold opening can be prevented and injection molding performed under the condition where outgassing is easy can improve the product quality. Furthermore, the technique does not cause extra burden on the mold, thereby preventing the mold life from being needlessly shortened.

FIGS. 3A to 3C are diagrams illustrating the set mold clamping forces and the mold states during injection (see Japanese Patent Application Laid-Open No. 2013-75382). FIGS. 4A to 4C illustrate the mold starting to open from the upper part thereof during injection. The mold state as illustrated in State 3 in FIG. 4C is herein referred to as "a state in which the part of the mold that first opens is an upper part thereof". In this state, the upper tie bar is extended to be longer than that at the mold clamping completion time whereas the length of the lower tie bar is kept approximately the same as that at the mold clamping completion time. To detect the mold clamping force, a mold clamping force detector is often provided on one tie bar out of a plurality of tie bars for detecting the tie bar extension. If the mold clamping force detector is provided on the upper tie bar when the mold is as in State 3 in FIGS. 4A to 4C, an increase in the mold clamping force, that is, opening of the mold can be detected after the mold is closed during injection. By contrast, if the mold clamping force detector is provided on the lower tie bar, the mold clamping force detector on the lower tie bar cannot detect change in the mold clamping force during injection, that is, opening of the mold.

In the part of the mold that is opening, the mold opening force by the resin pressure exceeds the mold clamping force applied on the mold. The opening part is decided depending on multiple factors such as distribution of forces that the mold receives from the molten resin and the mold clamping force balance. The distribution of forces that the mold receives from the molten resin depends on the shape and the arrangement of a cavity. Estimation of the distribution of forces may be easy in some cases, and difficult in other cases. The mold clamping force balance is hard to accurately grasp depending on the adjustment condition of the injection molding machine and the parallelization degree of parting faces of the mold, and thus has to be measured each time.

As described above, it is hard to estimate the part of the mold that first opens. This is why injection molding is actually performed to estimate the part of the mold that first opens based on the position where burr is generated. Furthermore, if the part of the mold that first opens is identified, a mold clamping force detector has to be provided on a tie bar nearest to the part to detect the mold clamping force applied on the area surrounding the part. The part of the mold that first opens is different for each mold. This may cause the burden of rearranging the mold clamping force detector on another tie bar in association with replacement of the mold.

SUMMARY OF THE INVENTION

The object of the present invention is to further improve the technique related to mold clamping force setting of an injection molding machine disclosed in Japanese Patent Application Laid-Open No. 2013-75382 described above and provide a mold clamping force setting device and a mold clamping force setting method of an injection molding machine for obtaining more accurately the minimum mold clamping force that does not open the mold without being influenced by factors such as the shape and the arrangement of a cavity in the mold and the mold clamping force balance of a mold clamping part of the injection molding machine.

In the mold clamping force setting device of an injection molding machine according to the present invention, the injection molding machine includes a mold clamping part that closes a mold based on a set mold clamping force to generate a mold clamping force and an injection part that injects molten resin into the mold. The mold clamping force setting device includes: a plurality of mold clamping force detecting parts configured to detect mold clamping forces in different positions on a mold clamping part; a maximum mold clamping force increase amount calculation part configured to perform injection with an optional set mold clamping force and obtain a maximum mold clamping force increase amount being the difference between the mold clamping forces, generated when the mold is closed, that have been detected by the mold clamping force detecting parts and a maximum mold clamping force value during injection, generated when molten resin is injected into the mold, for each of the mold clamping force detecting parts; a storing part configured to store therein mold clamping forces generated when the mold is closed and the corresponding maximum mold clamping force increase amounts, for each of the mold clamping force detecting parts; an extracting part configured to extract two or more pairs of the set mold clamping force and the maximum mold clamping force increase amount that are different in maximum mold clamping force increase amount and have a set mold clamping forces not enough to open the mold, in at least one of the mold clamping force detecting parts; a relational expression calculation part configured to, for the mold clamping force detecting part for which the two or more pairs of the set mold clamping force and the maximum mold clamping force increase amount are extracted by the extracting part, obtain a relational expression indicating a maximum mold clamping force increase amount with respect to a set mold clamping force from the two or more pairs as a relational expression of the mold clamping force detecting part; a mold clamping force calculation part configured to, for the mold clamping force detecting parts for which the relational expressions therefore are obtained by the relational expression calculation part, perform injection with a set mold clamping force smaller than the set mold clamping forces included in the two or more pairs, extracted in association with the mold clamping force detecting part, calculate the maximum mold clamping force increase amount, and obtain a set clamping force when the maximum mold clamping force increase amount exceeds a predetermined threshold determined based on the relational expression of the mold clamping force detecting part; and a mold clamping force setting part configured to set a set mold clamping force immediately before the set mold clamping force obtained by the mold clamping force calculation part to a required minimum mold clamping force that does not open the mold.

The extracting part may be configured to extract two or more pairs of the set mold clamping force and the maximum mold clamping force increase amount for each mold clamping force detecting part of all the mold clamping force detecting parts, the relational expression calculation part may be configured to obtain a relational expression indicating a maximum mold clamping force increase amount with respect to a set mold clamping force for each mold clamping force detecting part of all the mold clamping force detecting parts, the mold clamping force calculation part may be configured to obtain a set clamping force for which the maximum mold clamping force increase amount exceeds the threshold determined based on the relational expression of the mold clamping force detecting part, for each mold clamping force detecting part out of all the mold clamping force detecting parts, and the mold clamping force setting part may be configured to, for the mold clamping force detecting part that obtained the largest set mold clamping force out of the set mold clamping forces obtained by the mold clamping force calculation part for each of the mold clamping force detecting parts, set a set mold clamping force immediately before the largest set mold clamping force in the mold clamping force detecting part to a required minimum mold clamping force that does not open the mold.

The set mold clamping force to be extracted by the extracting part may be a set mold clamping force for which the maximum mold clamping force increase amount is larger than a predetermined value.

The set mold clamping force to be extracted by the extracting part may be a set mold clamping force with which the molded item can be determined to be a conforming item.

The extracting part may be configured to start set mold clamping force extraction with a set mold clamping force sufficiently satisfying a mold clamping force calculated from the maximum injection pressure and the projected area of the mold and perform set mold clamping force extraction while lowering the set mold clamping force.

In the mold clamping force setting method of an injection molding machine according to the present invention, the injection molding machine includes a mold clamping part that closes a mold based on a set mold clamping force to generate a mold clamping force, an injection part that injects molten resin into the mold, and a plurality of mold clamping force detecting parts that detect mold clamping forces in different positions on the mold clamping part. The mold clamping force setting method includes: a maximum mold clamping force increase amount calculation step of performing injection with an optional set mold clamping force and obtaining the maximum mold clamping force increase amount based on the difference between the mold clamping forces, generated when the mold is closed, that have been detected by the mold clamping force detecting parts and the maximum mold clamping force value during injection, generated when molten resin is injected into the mold, for each of the mold clamping force detecting parts; an extracting step of extracting two or more pairs of the set mold clamping force and the maximum mold clamping force increase amount that are different in maximum mold clamping force increase amounts and have a set mold clamping force not enough to open the mold, in at least one of the mold clamping force detecting parts; a relational expression calculation step of, for the mold clamping force detecting part for which the two or more pairs of the set mold clamping force and the maximum mold clamping force increase amount are extracted at the extracting step, obtaining a relational expression indicating a maximum mold clamping force increase amount with respect to a set mold clamping force from the two or more pairs as a relational expression of the mold clamping force detecting part; a mold clamping force calculation step of, for the mold clamping force detecting parts for which the relational expressions therefore are obtained by the relational expression calculation step, performing injection with a set mold clamping force smaller than the set mold clamping force included in the two or more pairs, extracted in association with the mold clamping force detecting part, calculating the maximum mold clamping force increase amount, and obtaining a set clamping force when the maximum mold clamping force increase amount exceeds a predetermined threshold determined based on the relational expression of the mold clamping force detecting part; and a mold clamping force setting step of setting a set mold clamping force immediately before the set mold clamping force obtained at the mold clamping force calculation step to a required minimum mold clamping force that does not open the mold.

The extracting step may extract two or more pairs of the set mold clamping force and the maximum mold clamping force increase amount for each of the mold clamping force detecting part out of all the mold clamping force detecting parts, the relational expression calculation step may obtain a relational expression indicating a maximum mold clamping force increase amount with respect to a set mold clamping force for each of the mold clamping force detecting part out of all the mold clamping force detecting parts, the mold clamping force calculation step may obtain a set clamping force for which the maximum mold clamping force increase amount exceeds the threshold determined based on the relational expression of the mold clamping force detecting part, for each of the mold clamping force detecting part out of all the mold clamping force detecting parts, and the mold clamping force setting step may set, for the mold clamping force detecting part that obtained the largest set mold clamping force out of the set mold clamping forces obtained at the mold clamping force calculation step for each of the mold clamping force detecting parts, a set mold clamping force immediately before the largest set mold clamping force in the mold clamping force detecting part to a required minimum mold clamping force that does not open the mold.

The set mold clamping force to be extracted at the extracting step may be a set mold clamping force for which the maximum mold clamping force increase amount is larger than a predetermined value.

The set mold clamping force to be extracted at the extracting step may be a set mold clamping force for which the molded item can be determined to be a conforming item.

The extracting step may start set mold clamping force extraction with a set mold clamping force sufficiently satisfying a mold clamping force calculated from the maximum injection pressure and the projected area of the mold and performs set mold clamping force extraction while lowering the set mold clamping force.

The present invention can provide a mold clamping force setting device and a mold clamping force setting method of an injection molding machine for obtaining more accurately the minimum mold clamping force that does not open the mold without being influenced by factors such as the shape and the arrangement of the cavity in the mold and the mold clamping force balance of a mold clamping part of the injection molding machine.

BRIEF DESCRIPTION OF THE DRAWINGS

The above and other objects and features of the present invention will be apparent from the following description of embodiments with reference to the accompanying drawings in which.

DETAILED DESCRIPTION OF THE PREFERRED EMBODIMENTS

Firstly, the technique related to mold clamping force setting disclosed in Japanese Patent Application Laid-Open No. 2013-75382 which is the premise of the present invention is described, before embodiments of the present invention are described.

Figure 1:
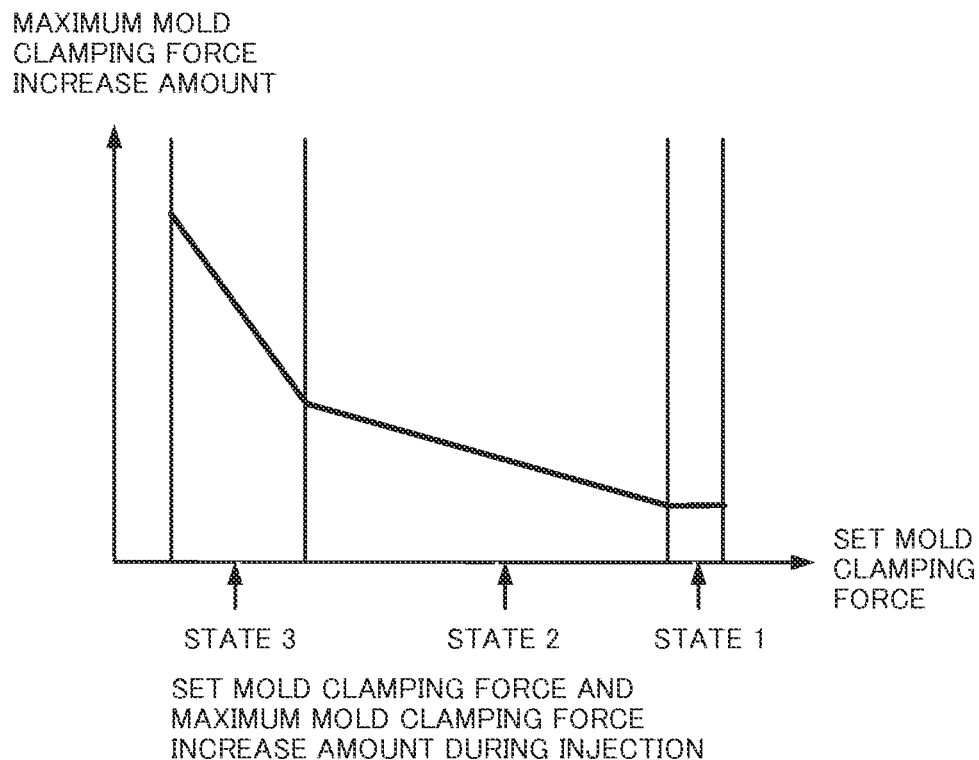
FIG. 1 is a graph showing the relation between a set mold clamping force and a maximum mold clamping force increase amount during injection.
Figure 2:
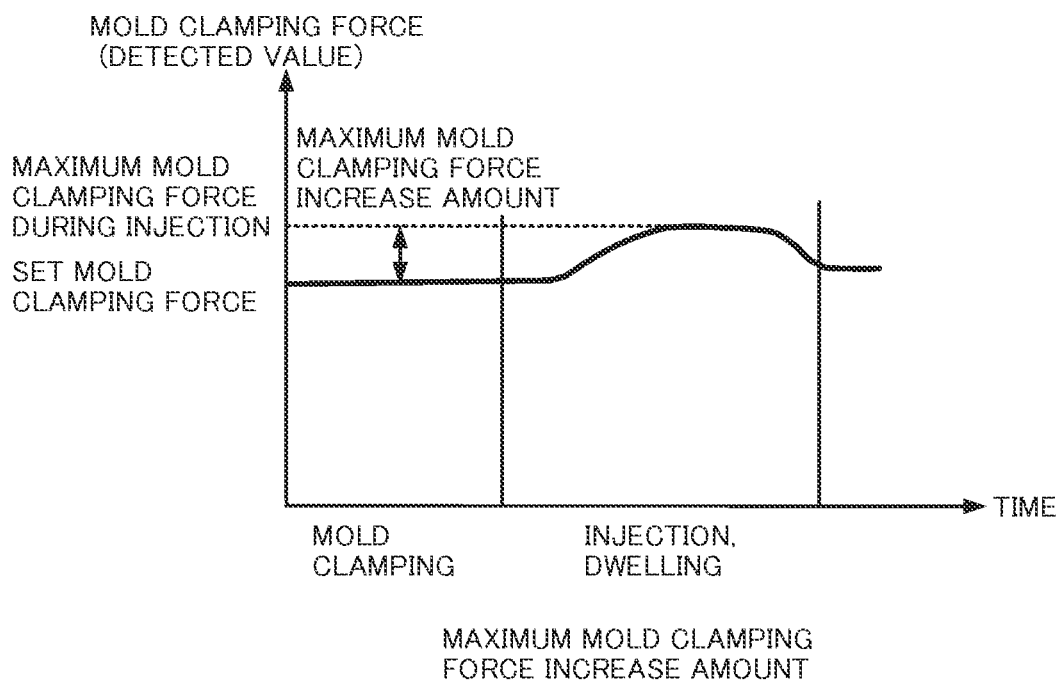
FIG. 2 is a graph showing temporal change of a mold clamping force.
Figure 3A:
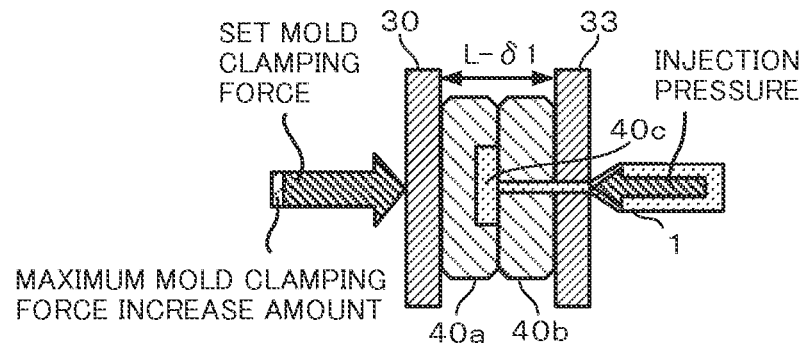
FIGS. 3A to 3C are diagrams illustrating set mold clamping forces and mold states during injection.
Figure 3B:
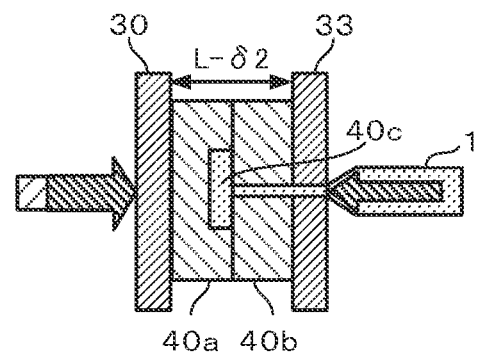
Figure 3C:
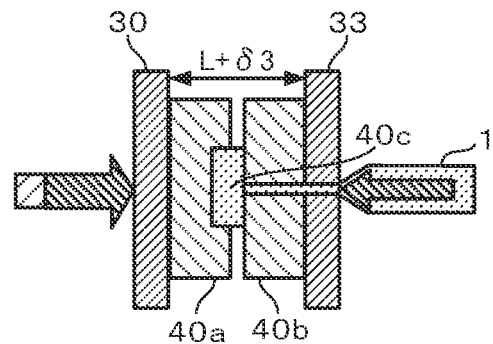

When a mold clamping force is insufficient with respect to the pressure with which molten resin is generated, a mold is opened, causing burr generation. FIG. 1 shows the relation between a set mold clamping force when a mold clamping force is lowered to the state in which the mold is opened from a mold clamping force considered as sufficiently satisfying in view of the maximum injection pressure and the projected area of the mold and a maximum mold clamping force increase amount representing the mold opening amount when the mold yields to the injection pressure during injection to open. The maximum mold clamping force increase amount here refers to the difference between the set mold clamping force and the maximum mold clamping force value during injection, as illustrated in FIG. 2. When this relation is analyzed, the relation can be classified into the following three states. The set mold clamping force and the mold state during injection in each state (State 1, State 2, and State 3) are illustrated in FIGS. 3A to 3C, respectively. The mold thickness of the mold is L.

State 1 (FIG. 3A): Section in which the maximum mold clamping force increase amount during injection does not change even if the set mold clamping force is lowered. In this section, because the mold clamping force is sufficiently large with respect to the injection pressure, the mold is distorted as being pushed and contracted. Ideally, the maximum mold clamping force increase amount during injection does not change. The mold is compressed by the contraction amount of $\delta 1$ by the mold clamping force, whereby the mold thickness is $L-\delta 1$. The distance between platens (or between a movable platen 30 and a fixed platen 33) also is $L-\delta 1$.

State 2 (FIG. 3B): Section in which the maximum mold clamping force increase amount during injection increases if the set mold clamping force is lowered. In this section, because the mold yields to the injection pressure to open due to the mold clamping force becoming lower than in State 1, the distortion of the mold generated in State 1 is gradually released. The maximum mold clamping force increase amount during injection thus increases by the amount of the released distortion during injection. The distortion is slightly released, the compression amount of the mold is $\delta 2$ which is smaller than $\delta 1 (0<\delta 2<\delta 1)$, and the distance between the platens is $L-\delta 2(>L-\delta 1)$.

State 3 (FIG. 3C): Section in which the maximum mold clamping force increase amount during injection increases more greatly than in State 2 if the set mold clamping force is lowered. In this section, because the distortion of the mold generated in State 1 and State 2 is completely released during injection, the mold thickness is L. In addition, because the mold opening amount δ3 is generated, the distance between the platens is L+δ3.

The "injection" described above represents all processes in which a screw is operated so that the molten resin is filled into the space inside the cavity of the mold and includes the process of applying pressure to the molten resin to completely fill the molten resin into the space inside the cavity of the mold, which is also referred to as a dwelling process.

Figure 5A:
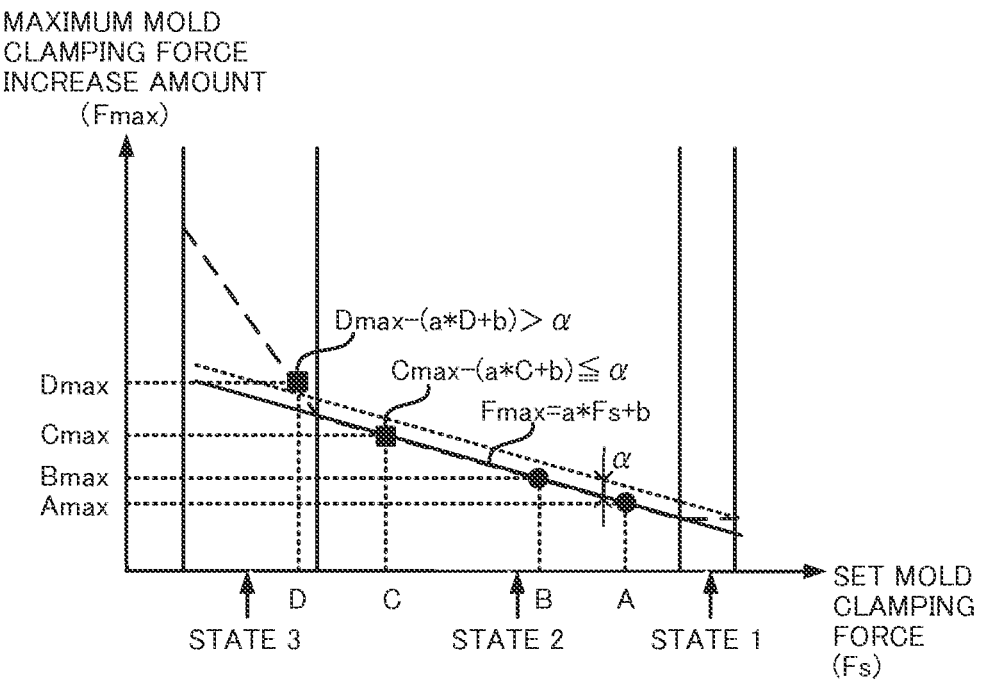
FIG. 5A is a graph explaining a change amount determination method of the maximum mold clamping force increase amount.

FIG. 5A is a graph explaining a method of determining a point where the change amount of the maximum mold clamping force increase amount shifts from State 2 to State 3. The horizontal axis represents the set mold clamping force (Fs) and the vertical axis represents the maximum mold clamping force increase amount during injection (Fmax).

To detect the shifting point from State 2 to State 3, change in State 2 is first obtained using an approximate straight line. For this, measurement of the maximum mold clamping force increase amount is performed at two optional points in the section of State 2 (see FIG. 3B) in which change is generated in the maximum mold clamping force increase amount due to release of distortion of the mold. With this process, a maximum mold clamping force increase amount Amax measured with respect to a set mold clamping force A and a maximum mold clamping force increase amount Bmax measured with respect to a set mold clamping force B are acquired. When the maximum mold clamping force increase amount Amax equals to the maximum mold clamping force increase amount Bmax at this time, the point is in the section of State 1. The set mold clamping force is thus further lowered and remeasurement is performed at a point where Amax<Bmax as illustrated in FIG. 5.

With the process described above, an approximate straight line Fmax=a×Fs+b representing the maximum mold clamping force increase amount in State 2 can be obtained based on the measured values Amax and Bmax. Because this straight line represents an increase in the mold clamping force generated due to release of distortion of the mold in State 2, a maximum mold clamping force increase amount Cmax measured with respect to a set mold clamping force C in the section of State 2 is a value satisfying Cmax−(a×C+b)≤α (α>0). In this case, α is a threshold in consideration of measurement error and variation. Injection is performed several times with one optional mold clamping force to detect the maximum mold clamping force increase amount, and the difference between the maximum and the minimum detected values can be set to the threshold. It should be noted that the method of obtaining the threshold is not limited to the method described above.

Next, a maximum mold clamping force increase amount Dmax measured with respect to a set mold clamping force D in the section of State 3 is a value satisfying Dmax−(a×D+b)>α because the mold clamping force increase amount greatly changes as the distortion has been completely released and the mold is in the state of opening.

More specifically, the method of determining the shifting point from State 2 to State 3 is as described below. An approximate straight line Fmax=a×Fs+b is obtained based on the maximum mold clamping force increase amounts at two optional points in the section of State 2. When a maximum mold clamping force increase amount Xmax, measured in a process of lowering a set mold clamping force X, is a value satisfying Xmax−(a×X+b)>α at the two points consecutively, the first point is determined as the shifting point to State 3. The point immediately before the shifting point is detected as the minimum mold clamping force that does not open the mold.

Next, the mold clamping force setting device and the mold clamping force setting method according to the present invention will be described.

Figure 5B:
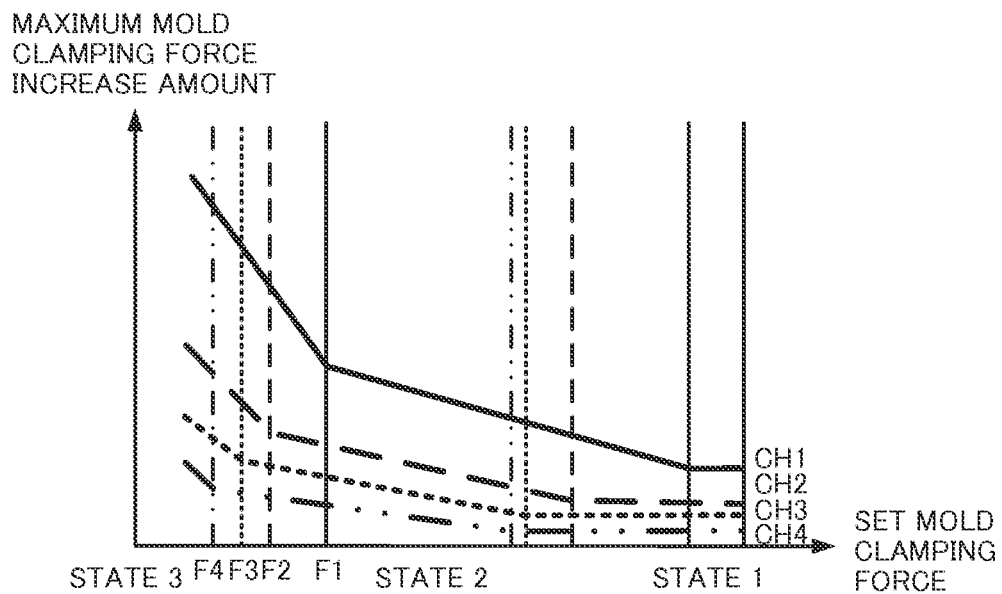
FIG. 5B is a diagram explaining a measurement method of the maximum mold clamping force increase amount using a plurality of mold clamping force sensors.

In the present invention, the calculation process of this minimum mold clamping force is performed by a plurality of mold clamping force sensors. As an example, the relation between mold clamping forces measured by four mold clamping force sensors CH1, CH2, CH3, and CH4 and the maximum mold clamping force increase amount is illustrated in FIG. 5B. The mold clamping force in shifting to the next state varies depending on the mold clamping force sensor. In FIG. 5B, the mold clamping force sensor CH1 shifts from State 2 to State 3 at a mold clamping force F1, the mold clamping force sensor CH2 shifts from State 2 to State 3 at a mold clamping force F2, the mold clamping force sensor CH3 shifts from State 2 to State 3 at a mold clamping force F3, and the mold clamping force sensor CH4 shifts from State 2 to State 3 at a mold clamping force F4. Because F1 is the largest among the mold clamping forces F1, F2, F3, and F4, the part of the mold that first opens is an area measured by CH1, indicating that the mold clamping force when the mold starts to open is F1. The point immediately before F1 is thus set as the minimum mold clamping force.

Two examples are described as methods of detecting the minimum mold clamping force. In one method, the set mold clamping force is sequentially decreased from a sufficiently large mold clamping force. During this process, the measurement is performed with each mold clamping force sensor CH1, CH2, CH3, or CH4 and processing is performed with each of the mold clamping force sensors until a shifting point from State 2 to State 3 is first detected by any one of the mold clamping force sensors. In the case of FIG. 5B, once F1 has been detected as the first shifting point from State 2 to State 3, the measurement is ended, and the point immediately before the shifting point is set as the minimum mold clamping force. In another method, the processing is continued until shifting to State 3 is completed with respect to all the mold clamping force sensors CH1, CH2, CH3, and CH4 and all the mold clamping forces F1 to F4 are detected. Then, the point immediately before the shifting point of the largest mold clamping force among all the shifting points is set as the minimum mold clamping force.

Furthermore, the area measured by the mold clamping force sensor detecting the smallest mold clamping force is the part of the mold that first opens, which causes burr generation on the molded item. The area thus indicates a part to be focused on in the product conformance inspection.

In the case where only slight burr is not acceptable, the minimum mold clamping force detected as a margin may be corrected within the section of State 2.

The set mold clamping force in State 2 in which the distortion of the mold is released can be obtained from the point where the change occurs in the maximum mold clamping force increase amount by performing injection with the mold clamping force in State 1 that is considered to be sufficiently satisfying in view of the maximum injection pressure and the projected area of the mold and calculating each of the maximum mold clamping force increase amounts during injection while the mold clamping forces are lowered. In addition to the method in which the set mold clamping force in State 2 is obtained by shifting the mold clamping force from State 1 to State 2 described above, a method may be used in which the maximum mold clamping force increase amounts are calculated with optional set mold clamping forces, and out of set mold clamping forces with which the maximum mold clamping force increase amounts change, a mold clamping force with which the molded item is determined to be a conforming item by the operator, a monitoring camera, or a quality determination function is set to be the set mold clamping force in State 2.

According to an embodiment of the present invention, using an injection molding machine including a mold clamping force detector, injection is started to be tried with a mold clamping force considered as sufficiently satisfying in view of the maximum injection pressure and the projected area of the mold, and then each of the maximum mold clamping force increase amounts during injection is measured while the mold clamping forces are lowered. More specifically, with an optional mold clamping force set so as to correspond to State 1, each of the maximum mold clamping force increase amounts during injection is measured while the mold clamping force is gradually lowered from the mold clamping force thus set.

In the embodiment according to the present invention, at least two different mold clamping forces have to be set in State 2 and two maximum mold clamping force increase amounts each corresponding to these two set mold clamping forces have to be obtained. Furthermore, at least one mold clamping force has to be set in State 3 and one maximum mold clamping force increase amount corresponding to this set mold clamping force has to be obtained.

As described above, the maximum mold clamping force increase amount represents the difference between the set mold clamping force and the maximum mold clamping force value during injection. Because the set mold clamping force does not necessarily correspond to the actual mold clamping force applied to the mold depending on the size and the structure of the mold, an accurate maximum mold clamping force increase amount may be measured based on the difference between a mold clamping force detected during the time after mold clamping and before injection and a maximum mold clamping force detected during injection, in the embodiment of the present invention. Thereafter, a point where the maximum mold clamping force increase amount during injection shifts from State 2 to State 3 (a point where the maximum mold clamping force increase amount greatly changes) is detected, and the mold clamping force immediately before that point may be set to the required minimum set mold clamping force that does not open the mold. In another embodiment, a linear approximate expression may be obtained in each of State 2 and State 3, and the required minimum set mold clamping force that does not open the mold may be obtained based on the intersection of these linear approximate expressions (the intersection of the straight line representing State 2 and the straight line representing State 3).

According to the present invention, the required minimum set mold clamping force that does not open the mold can be obtained more accurately than in the prior art technique (the technique disclosed in Japanese Patent Application Laid-Open No. 2013-75382). With the required minimum set mold clamping force obtained, burr generation due to the mold opening can be prevented and injection molding performed under the condition where outgassing is easy can improve the product quality. Furthermore, the technique does not cause extra burden on the mold, thereby preventing the mold life from being needlessly shortened.

Figure 6:
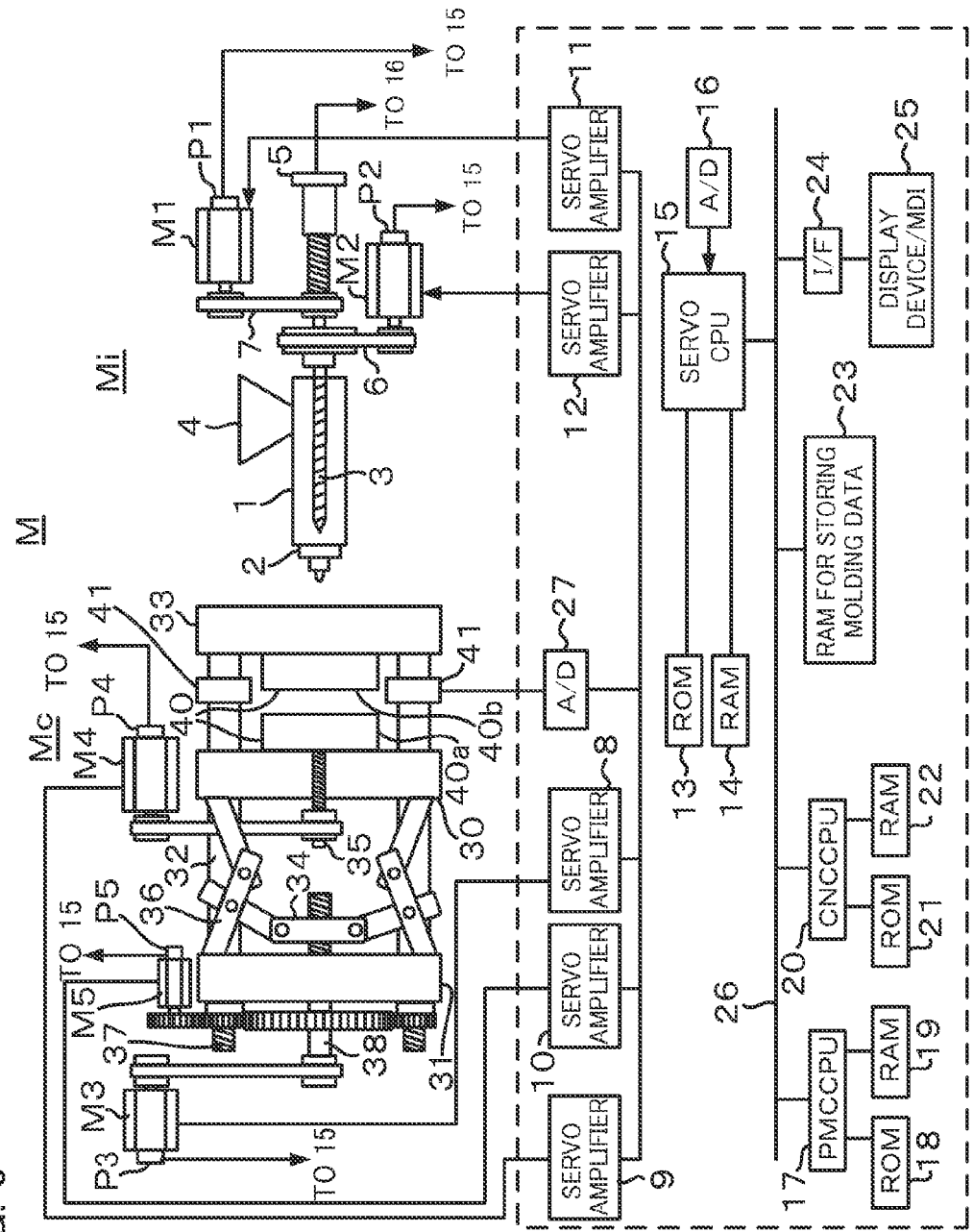
FIG. 6 is a schematic block diagram of an injection molding machine.

FIG. 6 is a schematic block diagram of an injection molding machine. The injection molding machine illustrated in FIG. 6 is configured as an injection molding machine that can set a mold clamping force using the mold clamping force setting method according to the present invention. An injection molding machine M includes a mold clamping part Mc and an injection part Mi on a machine table (not illustrated). The injection part Mi heats and melts a resin material (pellet) and injects the molten resin into a cavity of a mold 40. The mold clamping part Mc mainly opens and closes the mold 40 (a movable-side mold 40a and a fixed-side mold 40b).

Firstly, the injection part Mi will be described. To the tip of an injection cylinder 1, a nozzle 2 is attached. Into the injection cylinder 1, a screw 3 is inserted. To the screw 3, a resin pressure sensor 5 is provided that uses a load cell or other similar part detecting a resin pressure based on the pressure applied to the screw 3. An output signal from the resin pressure sensor 5 is converted from an analog signal into a digital signal by an A/D converter 16 and the converted signal is input into a servo CPU 15.

The screw 3 is rotated by a screw rotating servo motor M2 via a transmission mechanism 6 composed of a pulley, belt, and the like. The screw 3 is further driven by a screw advancing/retracting servo motor M1 via a transmission mechanism 7 including a mechanism that converts the rotary motion of a pulley, a belt, a ball screw/nut mechanism, or other similar part into a linear motion and moved in the axis direction of the screw 3. It should be noted that a reference sign P1 represents a position/speed detector that detects the position and the speed of the screw 3 in the axis direction thereof by detecting the position and the speed of the screw advancing/retracting servo motor M1, and a reference sign P2 represents a position/speed detector that detects a rotation position and speed of the screw 3 around an axis by detecting the position and the speed of the screw rotating servo motor M2. A reference numeral 4 is a hopper that supplies resin to the injection cylinder 1.

Next, the mold clamping part Mc will be described. A rear platen 31 and a fixed platen 33 are connected with a plurality of tie bars 32. A movable platen 30 is arranged so as to be guided by the tie bars 32. To the movable platen 30 and the fixed platen 33, the movable-side mold 40a and the fixed-side mold 40b are attached respectively. A toggle mechanism 36 is operated with a crosshead 34 advanced and retracted, which is attached to a ball screw axis 38 driven by a movable platen advancing/retracting servo motor M3. When the crosshead 34 is advanced (in the right direction in the 1 drawing), the movable platen 30 is advanced, whereby the mold is closed. Then, a mold clamping force which is the driving force of the movable platen advancing/retracting servo motor M3 multiplied by the toggle magnification is generated, and mold clamping is performed with the mold clamping force. An ejector advancing/retracting servo motor M4 drives an ejector mechanism 35 to push out an ejector pin (not illustrated), whereby a molded item is extruded from the mold.

At least two of the tie bars 32 are each provided with a mold clamping force sensor 41. Each of the mold clamping force sensors 41 is a sensor detecting the distortion of the tie bar 32 with which that mold clamping force sensor 41 is provided and corresponds to the mold clamping force detector. To the tie bar 32, a tensile force is applied corresponding to the mold clamping force during mold clamping, whereby the tie bar 32 is slightly extended in proportion to the mold clamping force. The extension amount of the tie bar 32 is detected by the mold clamping force sensor 41, from which the mold clamping force actually applied to the mold 40 can be acknowledged. As the mold clamping force sensor 41, a distortion sensor can be used, for example. A detection signal from the mold clamping force sensor 41 is transmitted to the servo CPU 15 via an A/D converter 27.

The graph in FIG. 2 showing the relation between a mold clamping force and a time is acquired based on a detection signal from the mold clamping force sensor 41. The set mold clamping force and the maximum mold clamping force increase amount which is the difference between the set mold clamping force and the maximum mold clamping force during injection are calculated by the servo CPU 15, and the data thus obtained is stored in a RAM 14. As the set mold clamping force in this process, a mold clamping force that is detected during the time after the mold closing is ended and before the injection is started is used. Alternatively, the set mold clamping force value may be used.

Figure 7A:
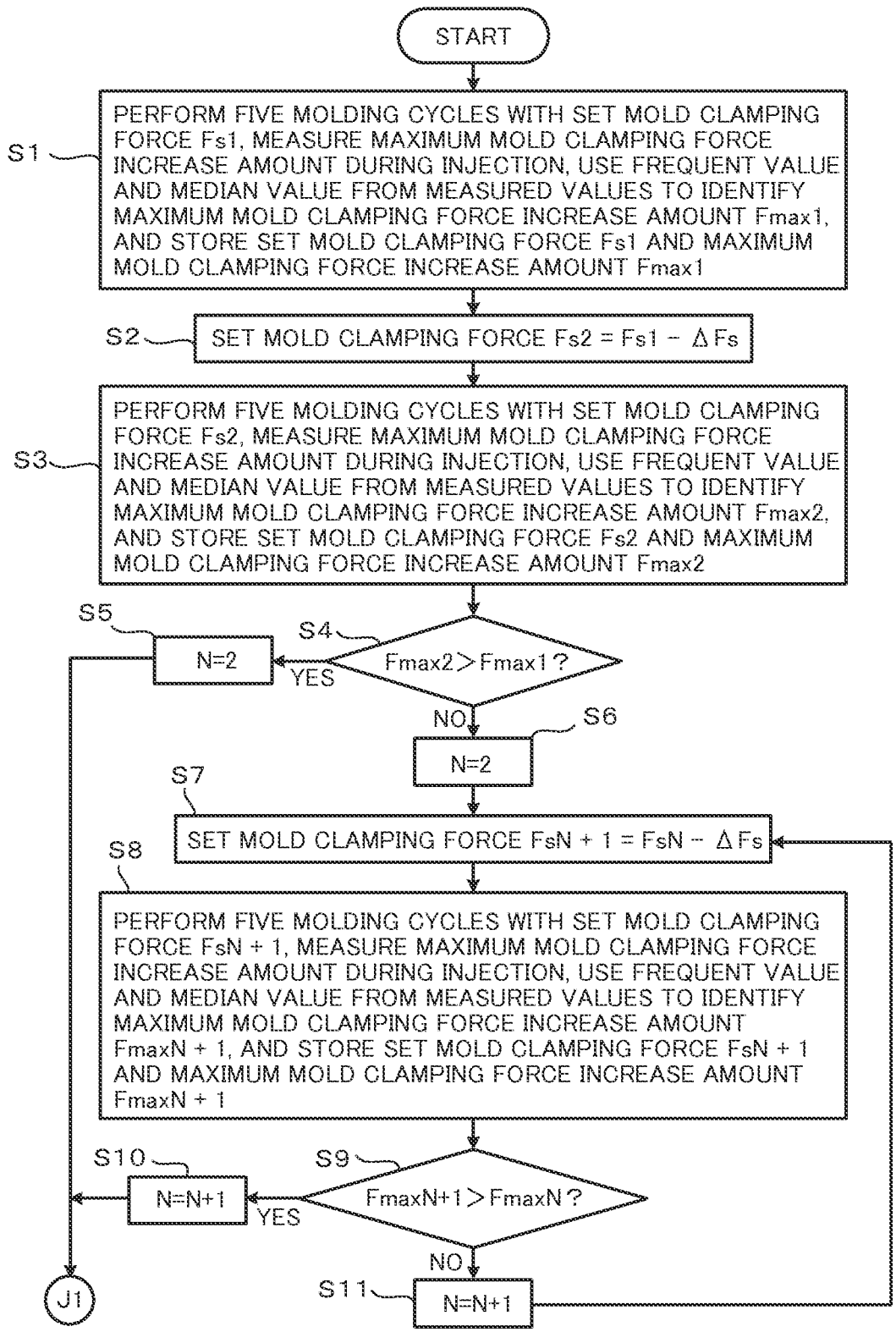
FIGS. 7A and 7B are flowcharts showing an algorithm of processing of obtaining the mold clamping force using one mold clamping force sensor.
Figure 7B:
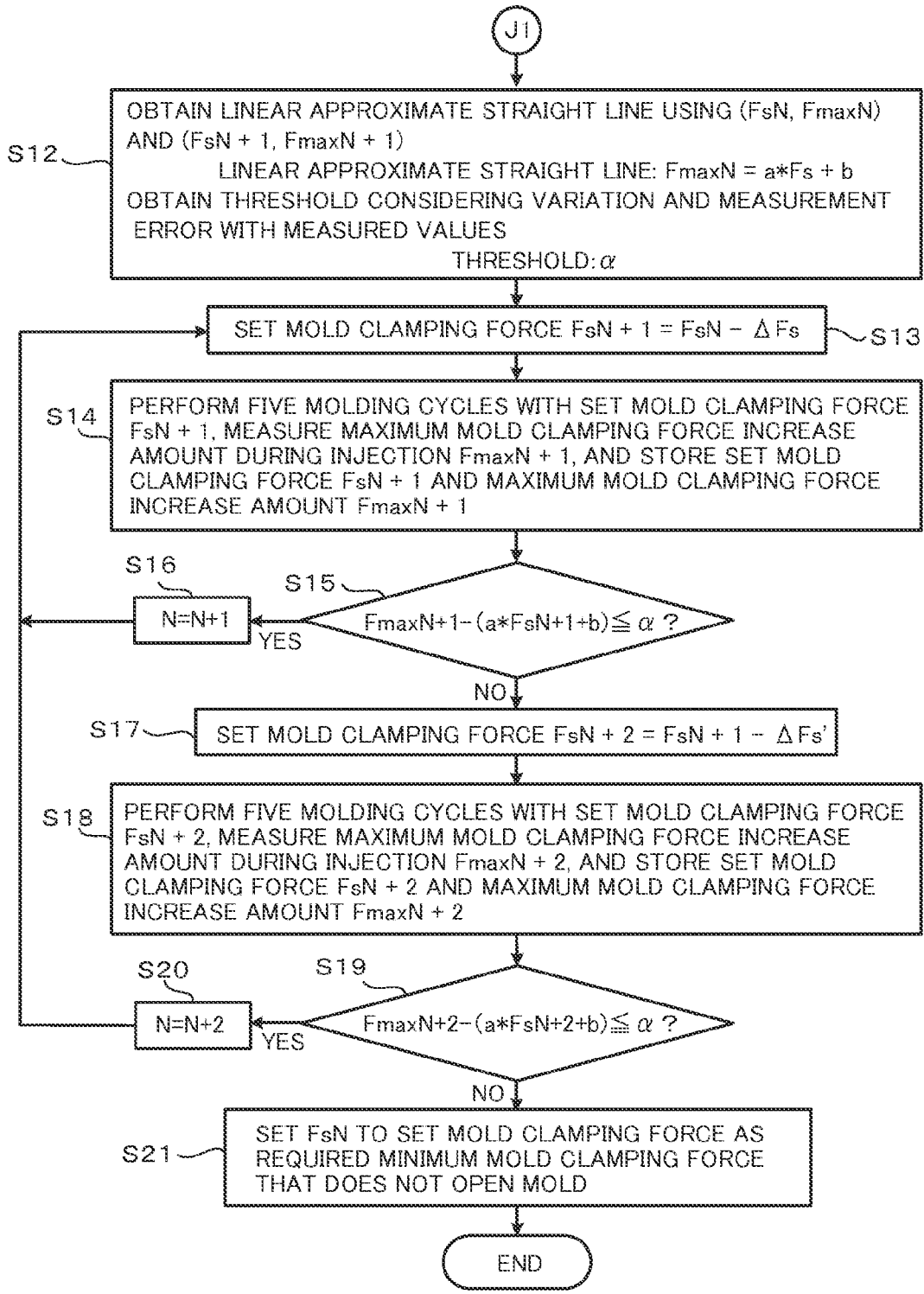
Figure 8:
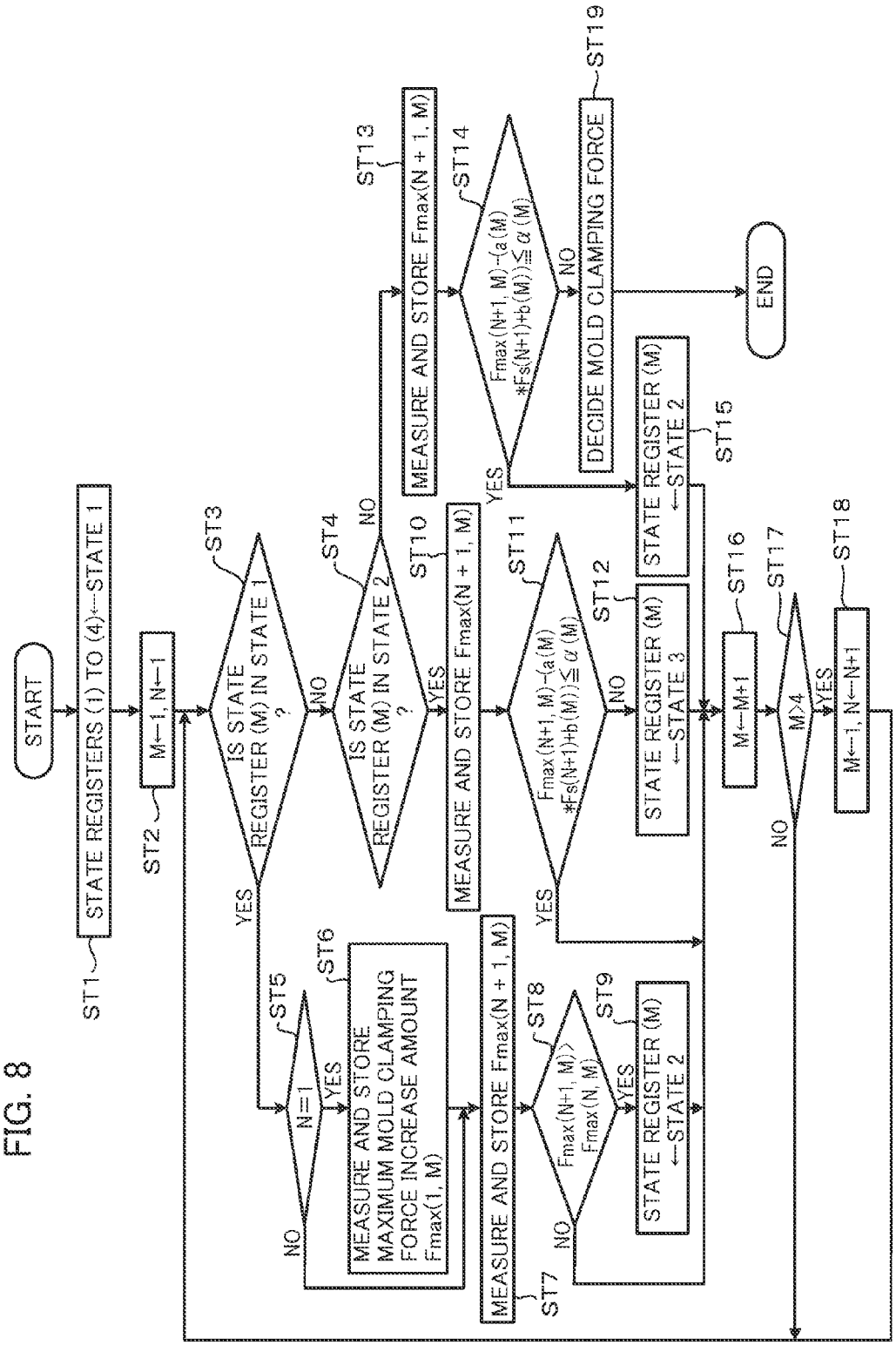
FIG. 8 is a flowchart showing an algorithm of processing obtaining an appropriate mold clamping force using a plurality of mold clamping force sensors.

The rear platen 31 is provided with a mold clamping position adjusting motor M5. To the rotary axis of the mold clamping position adjusting motor M5, a driving gear is attached. Around the gear of the tie bar nut and the driving gear, a power transmission member such as a toothed belt is wound. With this configuration, when the mold clamping position adjusting motor M5 is driven and the driving gear is rotated, tie bar nuts screwed on threaded portions 37 of the tie bars 32 are rotated in synchronization. This can rotate the mold clamping position adjusting motor M5 in a predetermined direction by a predetermined number of rotations to advance or retract the rear platen 31 by a predetermined distance. The mold clamping position adjusting motor M5 is preferably a servo motor and includes a position detector P5 for detecting the rotation position. The detection signal of the rotation position of the mold clamping position adjusting motor M5 detected by the position detector P5 is input into the servo CPU 15. In the present invention, with the mold clamping position adjusting motor M5 driven, the processing illustrated in FIGS. 7A, 7B, and 8 are performed, for example, whereby an optimum mold clamping force is set.

The controller of the injection molding machine M includes a CNC-CPU 20 being a microprocessor for numerical control, a PMC-CPU 17 being a microprocessor for programmable machine controller, and the servo CPU 15 being a microprocessor for servo control and is configured to perform communication among these microprocessors by inputs and outputs selected thereamong via a bus 26.

To the servo CPU 15, a ROM 13 storing therein a control program dedicated for servo control performing position loop processing, speed loop processing, and current loop processing and the RAM 14 used for temporal data storage are connected. Furthermore, the servo CPU 15 is connected so as to detect a pressure signal from the resin pressure sensor 5 detecting various pressures such as an injection pressure, which is provided on the injection molding machine body side via the analog/digital (A/D) converter 16. To the servo CPU 15, a servo amplifier 11 driving the screw advancing/retracting servo motor M1 connected to an injection axis and a servo amplifier 12 driving the screw rotating servo motor M2 connected to a screw rotary axis based on a command from the servo CPU 15 are connected. The servo CPU 15 is configured such that outputs from the position/speed detectors P1 and P2 attached to the servo motors M1 and M2 respectively are returned to the servo CPU 15. The rotation positions of the servo motors M1 and M2 are calculated by the servo CPU 15 based on positional feedback signals from the position/speed detectors P1 and P2 and updated and stored in each of current position storage registers.

To the movable platen advancing/retracting servo motor M3 and the ejector advancing/retracting servo motor M4, servo amplifiers 8 and 9 are connected respectively. It is configured such that outputs from the position/speed detectors P3 and P4 attached to the servo motor M3 and M4 respectively are returned to the servo CPU 15. The rotation positions of the servo motors M3 and M4 are calculated by the servo CPU 15 based on the positional feedback signals from the position/speed detectors P3 and P4 and updated and stored in each of current position storage registers.

To the PMC-CPU 17, a ROM 18 storing therein a sequence program controlling sequence operations of the injection molding machine and the like and a RAM 19 used for temporary storage of calculation data or the like are connected. To the CNC-CPU 20, a ROM 21 storing therein various programs such as an automatic operation program controlling the overall operation of the injection molding machine and a control program executing the mold clamping force setting method related to the present invention and a RAM 22 used for temporary storage of calculation data are connected. A RAM 23 for storing molding data is a non-volatile memory for storing molding data and stores therein molding conditions related to the injection molding operations and data such as various setting values, parameters, and macro variables. A display device/manual data input device (MDI) 25 is connected to the bus 26 via an interface (I/F) 24 and enables operations such as function menu selection and inputs of various types of data with numeric keys for inputting numerical data, various function keys, and the like provided thereon. It should be noted that the display device may be one using a liquid crystal display (LCD), CRT, or other type of display device.

With the configuration of the injection molding machine described above, the PMC-CPU 17 controls the sequence of the entire injection molding machine, the CNC-CPU 20 distributes movement commands with respect to the servo motor of each axis based on data such as the operation programs in the ROM 21 and the molding conditions stored in the RAM 23 for storing molding data, the servo CPU 15 performs digital servo processing based on the movement commands distributed to each axis and signals such as positional and speed feedback signals detected by the position/speed detectors P1, P2, P3, P4, and P5, whereby driving of the servo motors M1, M2, M3, M4, and M5 are controlled.

Figure 4A:
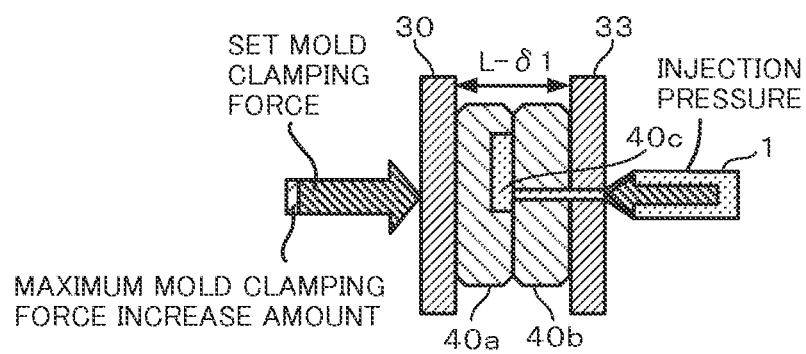
FIGS. 4A to 4C are diagrams illustrating set mold clamping forces and mold states during injection in case where there is a deviation of a cavity in a mold and the mold starts to open from the upper part thereof during injection.
Figure 4B:
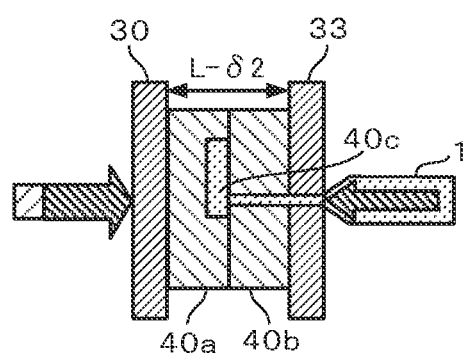
Figure 4C:
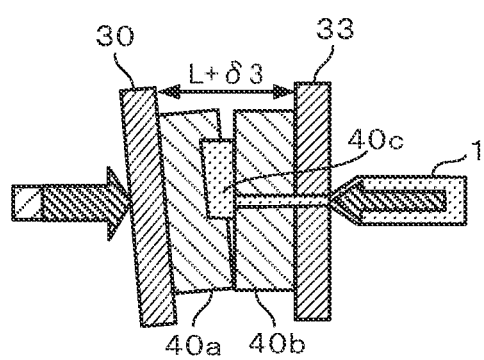

Molding operations using the injection molding machine M will be described. When the movable platen advancing/retracting servo motor M3 is rotated in the positive direction, the ball screw axis 38 is rotated in the positive direction, the crosshead 34 screwed on the ball screw axis 38 is advanced (in the right direction in FIG. 4). When the toggle mechanism 36 is operated, the movable platen 30 is advanced.

When the movable-side mold 40a attached to the movable platen 30 comes in contact with the fixed-side mold 40b (mold closing state), the processing proceeds to the mold clamping process. In the mold clamping process, the movable platen advancing/retracting servo motor M3 is further driven in the positive direction, whereby the toggle mechanism 36 generates a mold clamping force on the mold 40. Furthermore, the screw advancing/retracting servo motor M1 provided on the injection part Mi is driven to advance the screw 3 in the axis direction thereof, whereby the space in the cavity formed in the mold 40 is filled with molten resin. If the movable platen advancing/retracting servo motor M3 is driven in the reverse direction when mold opening is performed, the ball screw axis 38 is rotated in the reverse direction. Accompanied by this, the crosshead 34 is retracted and operated in the direction that the toggle mechanism 36 is bent, and the movable platen 30 is moved (retracted) in the direction of the rear platen 31. Once the mold opening process has been completed, the ejector advancing/retracting servo motor M4 is operated to push out the ejector pin pushing a molded item from the movable-side mold 40a. With this process, the ejector pin (not illustrated) is pushed out from the inside of the movable-side mold 40a and the molded item inside the movable-side mold 40a is pushed out from the movable-side mold 40a.

Next, the mold clamping force setting method and the mold clamping force setting device according to the embodiment of the present invention will be described. In the embodiment of the present invention, the mold clamping force sensor 41 is attached to the tie bar 32 to detect the mold clamping force during molding, and the appropriate mold clamping force is obtained based on the detected value.

FIGS. 7A and 7B are flowcharts showing the flow in which a minimum mold clamping force is detected by one mold clamping force sensor in the prior art technique (disclosed in Japanese Patent Application Laid-Open No. 2013-75382), which will be described below in accordance with steps.

[Step S1] Five molding cycles are executed with a set mold clamping force Fs1 that is sufficiently satisfying and the maximum mold clamping force increase amounts during injection are measured. A maximum mold clamping force increase amount Fmax1 is specified using a value such as the frequent value or the median value so that any fluctuation in the measured values or measurement error is eliminated. A set mold clamping force Fs1 and a maximum mold clamping force increase amount Fmax1 corresponding to the set mold clamping force Fs1 are stored.

[Step S2] A set mold clamping force Fs2 is set to (Fs1−ΔFs). ΔFs is a positive value.

[Step S3] Five molding cycles are executed with a set mold clamping force Fs2 and the maximum mold clamping force increase amounts during injection are measured. A maximum mold clamping force increase amount Fmax2 is specified using a value such as the frequent value or the median value so that any fluctuation in the measured values or measurement error is eliminated. A single set mold clamping force Fs2 and a single maximum mold clamping force increase amount Fmax2 corresponding to the set mold clamping force Fs2 are stored.

[Step S4] If Fmax1 obtained at Step S1 and Fmax2 obtained at Step S3 are in the relation of Fmax1<Fmax2 (determination result 'Yes'), the processing proceeds to Step S5. If not (determination result 'No'), the processing proceeds to Step S6.

[Step S5] N is set to 2 (N=2), wherein N represents the number of times the set mold clamping force is changed in order to specify the maximum mold clamping force increase amount.

[Step S6] N is set to 2 (N=2), wherein N represents the number of times the set mold clamping force is changed in order to specify the maximum mold clamping force increase amount.

[Step S7] A set mold clamping force Fs3 is set to (Fs2−ΔFs), wherein ΔFs is a positive value.

[Step S8] Five molding cycles are executed with a set mold clamping force Fs3 and the maximum mold clamping force increase amounts during injection are measured. A maximum mold clamping force increase amount Fmax3 is specified using a value such as the frequent value or the median value so that any fluctuation in the measured values or measurement error is eliminated. A single set mold clamping force Fs3 and a single maximum mold clamping force increase amount Fmax3 corresponding to the set mold clamping force Fs3 are stored.

[Step S9] If Fmax2 obtained at Step S3 and Fmax3 obtained at Step S8 are in the relation of Fmax2<Fmax3 (determination result 'Yes'), the processing proceeds to Step S10. If not (determination result 'No'), the processing proceeds to Step S11.

[Step S10] 1 is added to N, and the processing proceeds to Step S12.

[Step S11] 1 is added to N, and the processing returns to Step S5. More specifically, the processes at Steps S7, S8, S9 and S11 are repeated until FmaxN<FmaxN+1 is satisfied.

[Step S12] A linear approximate straight line Fmax=a×Fs+b is obtained using (FsN, FmaxN) and (FsN+1, FmaxN+1) which are the values compared at the preceding steps, wherein a pair of the set mold clamping force and the maximum mold clamping force increase amount is expressed as (FsN, FmaxN), for example. Furthermore, a threshold α(α>0) is obtained based on fluctuation in measured data and measurement error.

[Step S13] A set mold clamping force FsN+1 is set to (FsN−ΔFs), wherein ΔFs is a positive value.

[Step S14] Five molding cycles are executed with a set mold clamping force FsN+1 and the maximum mold clamping force increase amount during injection FmaxN+1 is measured. A single set mold clamping force FsN+1 and a single maximum mold clamping force increase amount FmaxN+1 are stored.

[Step S15] If a maximum mold clamping force increase amount a×FsN+1+b, obtained from the linear approximate straight line obtained at Step S12 with respect to the set mold clamping force FsN+1, and the maximum mold clamping force increase amount FmaxN+1, measured at Step S14, are in the relation of FmaxN+1−(a×FsN+1+b)≤α (determination result 'Yes'), the processing proceeds to Step S16. If not (determination result 'No'), the processing proceeds to Step S17.

[Step S16] 1 is added to N, and the processing proceeds to Step S13.

[Step S17] A set mold clamping force FsN+2 is set to (FsN+1−ΔFs'), wherein ΔFs' is a positive value smaller than ΔFs.

[Step S18] Five molding cycles are executed with a set mold clamping force FsN+2 and the maximum mold clamping force increase amount during injection FmaxN+2 is measured. A single set mold clamping force FsN+2 and a single maximum mold clamping force increase amount FmaxN+2 are stored.

[Step S19] If a maximum mold clamping force increase amount a×FsN+2+b obtained from the linear approximate straight line obtained at Step S12 with respect to the set mold clamping force FsN+2 and the maximum mold clamping force increase amount FmaxN+2 measured at Step S18 are in the relation of FmaxN+2−(a×FsN+2+b)≤α (determination result 'Yes'), the processing proceeds to Step S20. If not (determination result 'No'), the processing proceeds to Step S21.

[Step S20] 2 is added to N, and the processing proceeds to Step S13.

[Step S21] FsN is set to the set mold clamping force as the required minimum mold clamping force that does not open the mold, and the processing is completed.

Next, the present invention will be described. In the present invention, at least two mold clamping force sensors detect the minimum mold clamping force. The flowchart in FIG. 8 shows an example in which four mold clamping force sensors detect the minimum mold clamping force, which will be described below in accordance with steps.

[Step ST1] State registers (1) to (4) allocated to each mold clamping force sensor are brought into State 1.

[Step ST2] N and M are set to 1, and the processing is started with respect to the first mold clamping force sensor, wherein N is the number of times the mold clamping force is changed and M is the number of the state register. [Step ST3] If a state register (M) is in State 1(determination result 'Yes'), the processing proceeds to Step ST5. If the state register (M) is in any other state (determination result 'No'), the processing proceeds to Step ST4.

[Step ST4] If the state register (M) is in State 2 (determination result 'Yes'), the processing proceeds to Step ST10. If the state register (M) is in any other state (determination result 'No'), the processing proceeds to Step ST13.

[Step ST5] If the value of N is 1 (determination result 'Yes'), the processing proceeds to Step ST6. If the value of N is not 1 (determination result 'No'), the processing proceeds to Step ST7.

[Step ST6] Five molding cycles are executed with a set mold clamping force Fs(1) that is sufficiently satisfying and the maximum mold clamping force increase amounts during injection are measured. A single maximum mold clamping force increase amount Fmax(1, M) with respect to the set mold clamping force Fs(1) is stored using a value such as the frequent value or the median value so that any fluctuation in the measured values or a measurement error is prevented. The processing then proceeds to Step ST7.

[Step ST7] A set mold clamping force Fs(N+1) is set to (Fs(N)−ΔFs), wherein ΔFs is a positive value. Five molding cycles are executed with the set mold clamping force Fs(N+1) and the maximum mold clamping force increase amounts during injection are measured. A single maximum mold clamping force increase amount Fmax(N+1, M) with respect to the set mold clamping force Fs(N+1) is stored using a value such as the frequent value or the median value so that any fluctuation in the measured values or measurement error is eliminated. The processing then proceeds to Step ST8.

[Step ST8] If Fmax(N+1, M)>Fmax(N, M) (determination result 'Yes'), the processing proceeds to Step ST9. If not (determination result 'No'), the processing proceeds to Step ST16.

[Step ST9] A linear approximate straight line F(N, M)=a(M)×Fs(N)+b(M) is obtained using (Fs(N), Fmax(N, M)) and (Fs(N+1), Fmax(N+1, M)) which are the values measured by the preceding steps. Furthermore, a threshold α(M) (α(M)>0) is obtained based on fluctuation of measured data or measurement error. The state register (M) is brought into State 2, and the processing proceeds to Step ST16.

[Step ST10] Five molding cycles are executed with the set mold clamping force Fs(N+1) and the maximum mold clamping force increase amount during injection Fmax(N+1, M) is measured and stored.

[Step ST11] If F(N+1, M)=a(M)×Fs(N+1)+b (M), obtained at Step ST9 with respect to the set mold clamping force Fs(N+1) in Step ST10, and the maximum mold clamping increase amount Fmax(N+1, M), measured at Step ST11, are in the relation of Fmax(N+1, M)−(a(M)×Fs(N+1)+b (M))≤α (M) (determination result 'Yes'), the processing proceeds to Step ST16. If not (determination result 'No'), the processing proceeds to Step ST12.

[Step ST12] The state register (M) is brought into State 3. The processing proceeds to Step ST16.

[Step ST13] Five molding cycles are executed with the set mold clamping force Fs(N+1) and the maximum mold clamping force increase amount during injection Fmax(N+1, M) is measured and stored.

[Step ST14] If F(N+1, M)=a(M)×Fs(N+1)+b (M), obtained at Step ST9 with respect to the set mold clamping force Fs(N+1) in Step ST13, and the maximum mold clamping increase amount Fmax(N+1, M), measured at Step ST13, are in the relation of Fmax(N+1, M)−(a(M)×Fs(N+1)+b (M))≤α (M) (determination result 'Yes'), the processing proceeds to Step ST15. If not (determination result 'No'), the processing proceeds to Step ST19.

[Step ST15] The state register (M) is brought into State 2. The processing proceeds to Step ST16.

[Step ST16] M is increased by 1, and the processing proceeds to processing of another mold clamping force sensor.

[Step ST17] If M>4, or if processing of all the four mold clamping force sensors is completed (determination result 'Yes'), the processing proceeds to Step ST18. If M is 4 or less (determination result 'No'), the processing proceeds to Step ST3.

[Step ST18] M is set to 1, and the processing returns to the processing of the first mold clamping force sensor. N is increased by 1 and the set mold clamping force is lowered, and the processing proceeds to Step ST3.

[Step ST19] Fs(N−1) is set to the set mold clamping force as the required minimum mold clamping force that does not open the mold, and the processing is completed.

In the method of Step ST1 to Step ST19, the processing is performed with each mold clamping force sensor until the minimum mold clamping force is detected at Step ST19. However, the mold clamping force sensor that has shifted to State 2 first tends to shift to State 3 first. For this reason, after one of the mold clamping force sensors has shifted to State 2, measurement and processing may be performed only with the mold clamping force sensor that has shifted to State 2.

Furthermore, in the processing in Steps ST1 to ST19, processing at Step ST19 is performed for any one of the mold clamping force sensors, and the processing is completed once the required minimum mold clamping force sensor has been obtained. As another method, the processing may be continued until all the mold clamping force sensors have shifted to State 3 to obtain the set mold clamping forces with which the mold clamping force sensors shift to State 3, and the largest set mold clamping force among the set mold clamping forces may be set to the minimum mold clamping force.

According to the present invention, mold clamping forces are measured with mold clamping force sensors provided on a plurality of tie bars, with which the part of the mold that first opens is specified, and the minimum set mold clamping force that does not open the mold in that part is obtained. With this configuration, burr generation due to the mold opening can be prevented and injection molding performed under the condition where outgassing is easy can improve the product quality. Furthermore, the configuration does not place an excessive burden on the mold, thereby preventing the mold life from being needlessly shortened.

The invention claimed is:
1. A mold clamping force setting device of an injection molding machine, the injection molding machine including a mold clamping part that closes a mold based on a set mold clamping force to generate a mold clamping force and an injection part that injects molten resin into the mold, the mold clamping force setting device comprising:

a plurality of mold clamping force detecting parts configured to detect mold clamping forces in different positions on the mold clamping part;

a maximum mold clamping force increase amount calculation part configured to perform injection with an optional set mold clamping force and obtain a maximum mold clamping force increase amount being the difference between the mold clamping forces, generated when the mold is closed, that have been detected by the mold clamping force detecting parts and a maximum mold clamping force value during injection, generated when molten resin is injected into the mold, for each of the mold clamping force detecting parts;

a storing part configured to store therein mold clamping forces generated when the mold is closed and the corresponding maximum mold clamping force increase amounts, for each of the mold clamping force detecting parts;

an extracting part configured to extract two or more pairs of the set mold clamping force and the maximum mold clamping force increase amount that are different in maximum mold clamping force increase amount and have a set mold clamping forces not enough to open the mold, in at least one of the mold clamping force detecting parts;

a relational expression calculation part configured to, for the mold clamping force detecting part for which the two or more pairs of the set mold clamping force and the maximum mold clamping force increase amount are extracted by the extracting part, obtain a relational expression indicating a maximum mold clamping force increase amount with respect to a set mold clamping force from the two or more pairs as a relational expression of the mold clamping force detecting part;

a mold clamping force calculation part configured to, for the mold clamping force detecting parts for which the relational expressions therefore are obtained by the relational expression calculation part, out of the plurality of mold clamping force detecting parts, perform injection with a set mold clamping force smaller than the set mold clamping forces included in the two or more pairs, extracted in association with the mold clamping force detecting part, calculate the maximum mold clamping force increase amount, and obtain a set clamping force when the maximum mold clamping force increase amount exceeds a predetermined threshold determined based on the relational expression of the mold clamping force detecting part; and a mold clamping force setting part configured to set a set mold clamping force immediately before the set mold clamping force obtained by the mold clamping force calculation part to a required minimum mold clamping force that does not open the mold.

2. The mold clamping force setting device of an injection molding machine according to claim 1, wherein extracting part is configured to extract two or more pairs of the set mold clamping force and the maximum mold clamping force increase amount for each mold clamping force detecting part of all the mold clamping force detecting parts, the relational expression calculation part is configured to obtain a relational expression indicating a maximum mold clamping force increase amount with respect to a set mold clamping force for each mold clamping force detecting part of all the mold clamping force detecting parts, the mold clamping force calculation part is configured to obtain a set clamping force for which the maximum mold clamping force increase amount exceeds the threshold determined based on the relational expression of the mold clamping force detecting part, for each mold clamping force detecting part out of all the mold clamping force detecting parts, and the mold clamping force setting part is configured to, for the mold clamping force detecting part that obtained the largest set mold clamping force out of the set mold clamping forces obtained by the mold clamping force calculation part for each of the mold clamping force detecting parts, set a set mold clamping force immediately before the largest set mold clamping force in the mold clamping force detecting part to a required minimum mold clamping force that does not open the mold.

3. The mold clamping force setting device of an injection molding machine according to claim 1, wherein the set mold clamping force to be extracted by the extracting part is a set mold clamping force for which the maximum mold clamping force increase amount is larger than a predetermined value.

4. The mold clamping force setting device of an injection molding machine according to claim 1, wherein the set mold clamping force to be extracted by the extracting part is a set mold clamping force with which the molded item can be determined to be a conforming item.

5. The mold clamping force setting device of an injection molding machine according to claim 1, wherein the extracting part is configured to start set mold clamping force extraction with a set mold clamping force sufficiently satisfying a mold clamping force calculated from the maximum injection pressure and the projected area of the mold and perform set mold clamping force extraction while lowering the set mold clamping force.

6. A mold clamping force setting method of an injection molding machine, the injection molding machine including a mold clamping part that closes a mold based on a set mold clamping force to generate a mold clamping force, an injection part that injects molten resin into the mold, and a plurality of mold clamping force detecting parts that detect mold clamping forces in different positions on the mold clamping part, the mold clamping force setting method comprising:

a maximum mold clamping force increase amount calculation step of performing injection with an optional set mold clamping force and obtaining the maximum mold clamping force increase amount based on the difference between the mold clamping forces, generated when the mold is closed, that have been detected by the mold clamping force detecting parts and the maximum mold clamping force value during injection, generated when molten resin is injected into the mold, for each of the mold clamping force detecting parts;

an extracting step of extracting two or more pairs of the set mold clamping force and the maximum mold clamping force increase amount that are different in maximum mold clamping force increase amounts and have a set mold clamping force not enough to open the mold, in at least one of the mold clamping force detecting parts;

a relational expression calculation step of, for the mold clamping force detecting part for which the two or more pairs of the set mold clamping force and the maximum mold clamping force increase amount are extracted at the extracting step, obtaining a relational expression indicating a maximum mold clamping force increase amount with respect to a set mold clamping force from the two or more pairs as a relational expression of the mold clamping force detecting part;

a mold clamping force calculation step of, for the mold clamping force detecting parts for which the relational expressions therefore are obtained by the relational expression calculation step, out of the plurality of mold clamping force detecting parts, performing injection with a set mold clamping force smaller than the set mold clamping force included in the two or more pairs, extracted in association with the mold clamping force detecting part, calculating the maximum mold clamping force increase amount, and obtaining a set clamping force when the maximum mold clamping force increase amount exceeds a predetermined threshold determined based on the relational expression of the mold clamping force detecting part; and a mold clamping force setting step of setting a set mold clamping force immediately before the set mold clamping force obtained at the mold clamping force calculation step to a required minimum mold clamping force that does not open the mold.

7. The mold clamping force setting method of an injection molding machine according to claim 6, wherein the extracting step extracts two or more pairs of the set mold clamping force and the maximum mold clamping force increase amount for each of the mold clamping force detecting part out of all the mold clamping force detecting parts, the relational expression calculation step obtains a relational expression indicating a maximum mold clamping force increase amount with respect to a set mold clamping force for each of the mold clamping force detecting part out of all the mold clamping force detecting parts, the mold clamping force calculation step obtains a set clamping force for which the maximum mold clamping force increase amount exceeds the threshold determined based on the relational expression of the mold clamping force detecting part, for each of the mold clamping force detecting part out of all the mold clamping force detecting parts, and the mold clamping force setting step sets, for the mold clamping force detecting part that obtained the largest set mold clamping force out of the set mold clamping forces obtained at the mold clamping force calculation step for each of the mold clamping force detecting parts, a set mold clamping force immediately before the largest set mold clamping force in the mold clamping force detecting part to a required minimum mold clamping force that does not open the mold.

8. The mold clamping force setting method of an injection molding machine according to claim 6, wherein the set mold clamping force to be extracted at the extracting step is a set mold clamping force for which the maximum mold clamping force increase amount is larger than a predetermined value.

9. The mold clamping force setting method of an injection molding machine according to claim 6, wherein the set mold clamping force to be extracted at the extracting step is a set mold clamping force for which the molded item can be determined to be a conforming item.

10. The mold clamping force setting method of an injection molding machine according to claim 6, wherein the extracting step starts set mold clamping force extraction with a set mold clamping force sufficiently satisfying a mold clamping force calculated from the maximum injection pressure and the projected area of the mold and performs set mold clamping force extraction while lowering the set mold clamping force.

* * * * *